Figure 1:
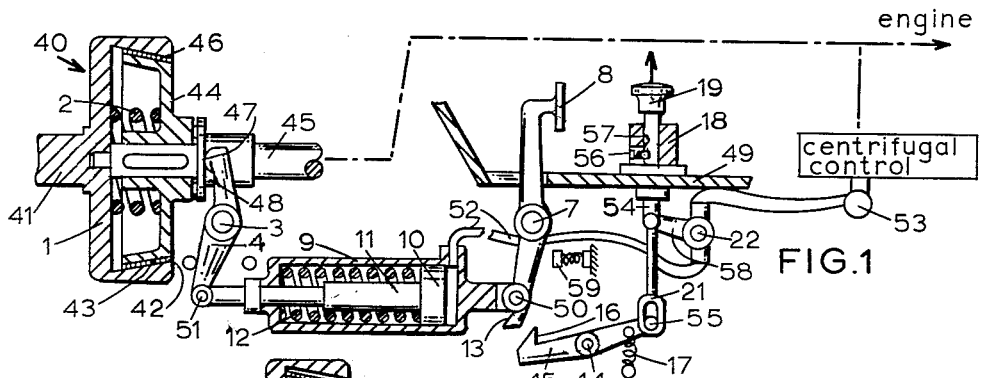

EDMOND UHER
*INVENTOR.*

BY Karl F. Ross

AGENT

United States Patent Office 3,092,229
Patented June 4, 1963

3,092,229
CONTROL MECHANISM FOR AUTOMOTIVE-
VEHICLE CLUTCHES AND THE LIKE
Edmond Uher, Chemin des Mougins,
Cap d'Antibes, France
Filed July 26, 1961, Ser. No. 127,033
Claims priority, application Germany July 29, 1960
5 Claims. (Cl. 192—103)

My present invention relates to improvements in actuating mechanisms for automotive clutches and other control units and, more particularly, to a mechanism for selectively operating such units in either an operator-controlled or a self-regulatory manner.

Modern automatic transmissions for automotive vehicles have been provided hitherto with pressure-responsive (i.e. hydraulic or pneumatic) control units, such as torque converters, clutches and the like, which are responsive to the angular velocity of a driving member (e.g. the drive shaft of an engine) to shift the transmission ratio in accordance with the angular velocity of the driving member. One type of pressure-responsive control unit is disclosed with greater detail in my copending application Ser. No. 127,001 filed on even date herewith. While such automatic units are highly efficient for use in most situations encountered in the operation of automotive vehicles, it is frequently advantageous to render the automatic system ineffective and to operate the unit manually, i.e. under the direct control of the operator. It often is desirable, for example, when traveling down steep inclines to utilize the braking effect of the engine and thus to avoid the tendency of an automatic transmission to alter the transmission ratio upon the racing of the engine in down-hill travel. Other situations in which direct operator control of the automatic clutch and/or transmission is of value, include the parking of the vehicle on inclines and the starting of the vehicle engine by displacement of the vehicle (e.g. by pushing or towing it). Generally, automatic transmissions require the displacement of the vehicle at relatively high rates of speed before the driving member is rotated with an angular velocity sufficient to start the engine. It is, accordingly, desirable to provide operator-controlled means for locking such units at a favorable transmission ratio in these circumstances.

It is, therefore, an object of the instant invention to provide a system for automatic regulating units affording operator control thereof.

Another object of my invention is to provide an improved clutch system for automotive vehicles selectively operable by automatic or operator-controlled means.

These objects are realized in a system, according to the invention wherein an automatic control means, such as a pressure-responsive servomotor of the type disclosed in my above-mentioned copending application, is coupled to a controlled unit (e.g. an automotive clutch) having at least two operative positions and including operator-actuatable means for rendering the automatic control means ineffective and for selectively displacing the controlled unit into either of these positions. According to a more specific feature of the invention, the automatic control means comprises two relatively displaceable members responsive to fluid pressure and controlled by regulating means sensitive to the angular velocity of a driving member, one of the relatively displaceable members being connected to the controlled unit while the other is connected to an actuating element of the operator-actuatable means for displacing at least one of the relatively displaceable members to operate the controlled unit. The operator-actuatable means may also include manually operable locking means for securing one of the members against displacement for automatic control of the unit. Advantageously, the automatic control means comprises a pressure-responsive servomotor wherein the fluid pressure acts to displace the two relatively movable servomotor members against the force of a restoring spring of greater strength than another spring associated with the controlled unit and acting to displace same into one of its operative positions. Thus, if the controlled unit is an automotive clutch wherein its spring tends to displace the clutch elements into the engaged position thereof, the pressure of the fluid in the servomotor tends to displace them against the force of their spring into the disengaged position. One of the servomotor members, e.g. a hydraulic piston, may then be connected with the clutch while the other, e.g. the hydraulic cylinder within which the piston is displaceable against the force of a strong restoring spring counteracting the force of the fluid, is connected to the actuating element (e.g. a pedal). The latter then tends to displace both servomotor elements which, in view of the greater strength of the servomotor spring than that of the clutch spring, acts as a substantially non-yielding link between the pedal and the clutch to operate the latter under the control of the operator.

As previously mentioned, the operator-actuatable means also advantageously includes releasable locking means engageable with the servomotor member connected to the actuating element to secure this member against displacement whereby fluid, under pressure, introduced into the servomotor will displace the piston to operate the clutch. According to another feature of the invention, the locking means is coupled with valve means for blocking the fluid conduit supplying the servomotor in the unlocked position of the locking means whereby no fluid pressure will be present to counter the action of the operator in displacing the actuating element.

The advantages of the foregoing construction will be readily apparent. When, for example, it is desired to park the vehicle on a steep grade, it is only necessary to operate the actuating element, which constitutes a clutch pedal, and disengage the locking means to cut out the automatic clutch and set the transmission of the vehicle in any desired gear. Similarly, transmission may be set in high gear to facilitate starting in cold weather upon pushing the vehicle or in a low gear to facilitate the climbing of steep hills. Moreover, the clutch pedal functions similarly to the conventional clutch pedals of non-automatic or so-called manual transmissions to permit drivers who dislike automatic transmissions to operate the vehicle without the use of such transmission. The actuating element, while preferably a pedal, may also be a hand lever or include a Bowden cable or other flexible link.

Figure 2:
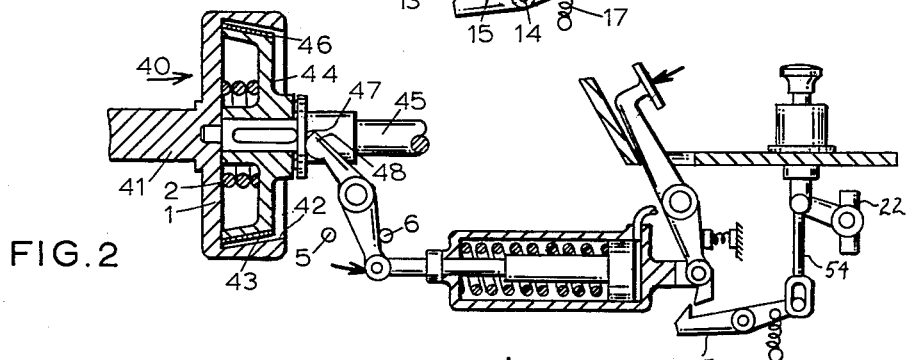
Figure 3:
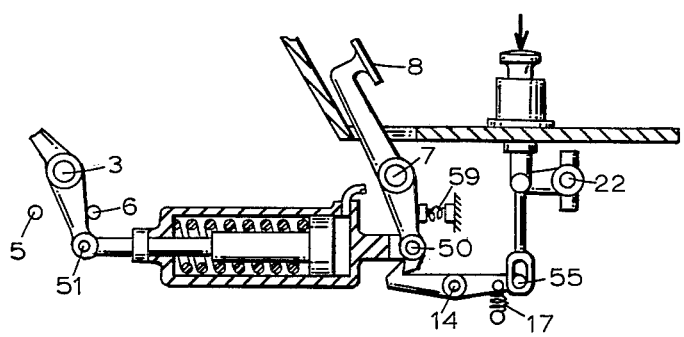
Figure 4:
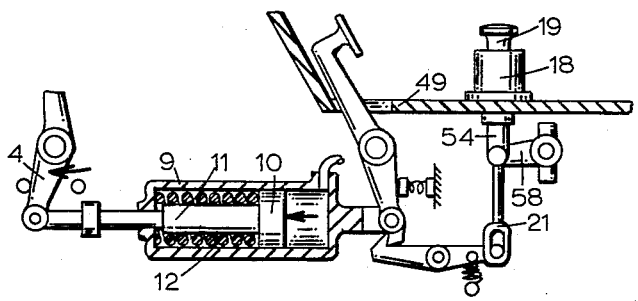

The above and other objects, features and advantages of the present invention will become more readily apparent from the following description, reference being made to the accompanying drawing in which:

FIG. 1 is a cross-sectional view of a control system according to the invention; and FIGS. 2-4 are views similar to FIG. 1 illustrating different positions of the elements of the system.

In the drawing I show a clutch 40 whose outer clutch member 1 is rigid with a shaft 41 secured to a conventional automatic transmission (not shown) and is formed with a conical clutch surface 42 frictionally engageable by the outer clutch surface 43 of an axially shiftable clutch member 44 keyed to the drive shaft 45 of an engine. The clutch surface 43 is provided with the usual brake lining 46 which is urged axially into engagement with the other clutch member 1 by an axial compression spring 2 bearing upon both members. The axially shiftable member 44 is also formed with an annular shoulder 47 against which a rounded protuberance 48 at one extremity of a double-arm lever 4 bears. The latter is pivoted on a pin 3 for displacement between the two stops 5 and 6, defining the limiting positions of the clutch, by a mechanism which includes a clutch pedal 8, protruding through the floor 49 of the vehicle, journaled at the pivot 7 to the vehicle housing. The distal end of the clutch-pedal lever 8 is pivoted at 50 to the hydraulic cylinder 9 of a servomotor whose piston 10 is connected via a piston rod 11 to the lever 4 and pivoted thereto at 51. A compression spring 12, of a strength greater than that of spring 2, bears upon the piston 10 and the cylinder 9 against the force of a pressure fluid fed to the cylinder 9 via a flexible conduit 52. The latter is connected, via a cut-off valve 22, with a source of fluid pressure responsive to the angular velocity of a driving member such as the engine shaft 45. The source of fluid pressure is, advantageously, a centrifugal control 53 of the type described in my above-mentioned copending application.

The system also incorporates a manually operable locking means which, as illustrated, includes a vertically displaceable pull rod 54, slidable in a guide 18 on the vehicle floor 49, which extends into the operator compartment of the vehicle adjacent the driver's seat and is formed with a knob 19. The lower end of the rod 54 is provided with an elongated, lost-motion slot 21 in which a pin 55, carried by the locking pawl 15, is displaceable. The locking pawl 15 is journaled at 14 to the vehicle housing and formed with a hooked extremity 16 adapted to engage the complementary extremity 13 of pedal lever 8. A tension spring 17 biases the pawl 15 into engagement with the pedal lever. The pull rod 54 co-operates with suitable indexing means, such as a spring-loaded ball 56 in the guide 18 which engages either of two indexing recesses 57 in the pull rod 54 to releasably secure the latter in its two operative positions (FIG. 1 and FIG. 3), and engages the arm 58 of the valve 22 to shift it into its two extreme positions, respectively illustrated in the latter figures.

With the pull rod 54 held by the indexing means 56, 57 in its elevated position shown in FIG. 1, the locking pawl 15 is angularly displaced against the force of spring 17 out of the path of the pedal lever 8 while, simultaneously, any flow of fluid from the centrifugal control 53 to the cylinder 9 via tube 52 is cut off by valve 22. The clutch 40 is shown in its engaged position, there being no counterforce acting oppositely to the force of clutch spring 2. It will be readily apparent, therefore, that a displacement of the pedal lever 8 by the operator of the vehicle in the counterclockwise sense (FIG. 2) will result in disengagement of the clutch 40, thereby permitting the operator to shift gears at will. Upon the release of the pedal 8, the system as well as clutch 40 returns under the action of spring 2 to the position shown in FIG. 1 wherein the clutch is once again engaged to hold the transmission in the gear to which it has been set.

Upon the shifting of pull rod 54 to its other extreme position (FIG. 3) and the consequent or simultaneous depression of pedal 8, the pawl 15 is biased by spring 17 into engagement with the pedal lever 8, thereby locking it in the position illustrated in FIG. 3. The actuation of rod 54 also opens valve 22 to unblock the fluid path to cylinder 9 so that fluid under a pressure proportional to the angular velocity of the engine shaft 45 flows to this cylinder. When this pressure reaches a value sufficient to overcome the net force of springs 2 and 12, the piston 10 is displaced to the left (FIG. 4) and the lever 4 is displaced clockwise to the position thereof illustrated in FIG. 1, thereby engaging the clutch and permitting automatic operation of the transmission. A resilient stop 59 prevents axial shifting of the cylinder 9 under the pressure of the fluid past a limiting righthand position. Upon the discharge of fluid from the cylinder, the pawl 15 can be released by a slight additional depression of the pedal 8 and the lifting of the pull rod 54 to its elevated position (FIGS. 1 and 2) whereupon the system may again be controlled by the operator. It is desirable that the complementary surfaces of the hook 16 and the lower extremity 13 of lever 8 be inclined toward each other or provided with complementary formations resisting disengagement from each other unless the pedal 8 is simultaneously depressed. It should also be noted that the valve 22 may be replaced by other means, such as an electric switch co-operating with a remote solenoid valve, for cutting off the flow of fluid to the servomotor.

The invention as described and illustrated is deemed to admit of many modifications and variations which will be readily apparent to persons skilled in the art and which are considered to be included within the spirit and scope of the invention claimed.

I claim:
1. In an automotive vehicle, a mechanism for operating a clutch including an engine-controlled drive member and a driven member urged by spring means into mutual engagement; said mechanism comprising a clutch-disengaging element adapted to bear upon one of said members against said spring means, a clutch-operating pedal, a linkage connecting said element with said pedal for enabling disengagement of said clutch upon displacement of said pedal from a normal position, a servomotor with two relatively displaceable bodies in said linkage, resilient means stronger than said spring force tending to maintain said bodies in a predetermined relative position, latch means operable to hold said pedal in an off-normal position in which said clutch is disengaged upon said bodies occupying said predetermined relative position, centrifugal control means responsive to engine speed for progressively displacing said bodies from said predetermined relative position in a sense tending to withdraw said element from said one of said members, and manually actuatable means for rendering said latch means ineffectual and simultaneously disabling said control means.

2. A mechanism as defined in claim 1 wherein said ratch means comprises a spring-loaded pawl, said pedal being provided with an extension engageable by said pawl in an effective position of the latter upon displacement of said pedal into said off-normal position.

3. A mechanism as defined in claim 1 wherein said bodies comprise a hydraulic cylinder and a piston in said cylinder, said control means including a source of pressure fluid for said cylinder.

4. A mechanism as defined in claim 3 wherein said source is provided with valve means for shutting off the flow of said fluid to said cylinder, said valve means being coupled with said manually actuatable means.

5. A mechanism as defined in claim 4 wherein said manually actuatable means comprises an axially shiftable rod coupled via a lost-motion connection with said pawl.

References Cited in the file of this patent

UNITED STATES PATENTS

| 976,983 | Cahall | Nov. 29, 1910 |
| 2,079,753 | Tower | May 11, 1937 |
| 2,513,439 | Ainsworth | July 4, 1950 |
| 2,848,080 | Binder | Aug. 19, 1958 |

FOREIGN PATENTS

| 732,252 | Great Britain | June 22, 1955 |